Feb. 28, 1933.   J. B. McWILLIAMS   1,899,766
CONVEYER
Filed Nov. 25, 1930   2 Sheets-Sheet 1
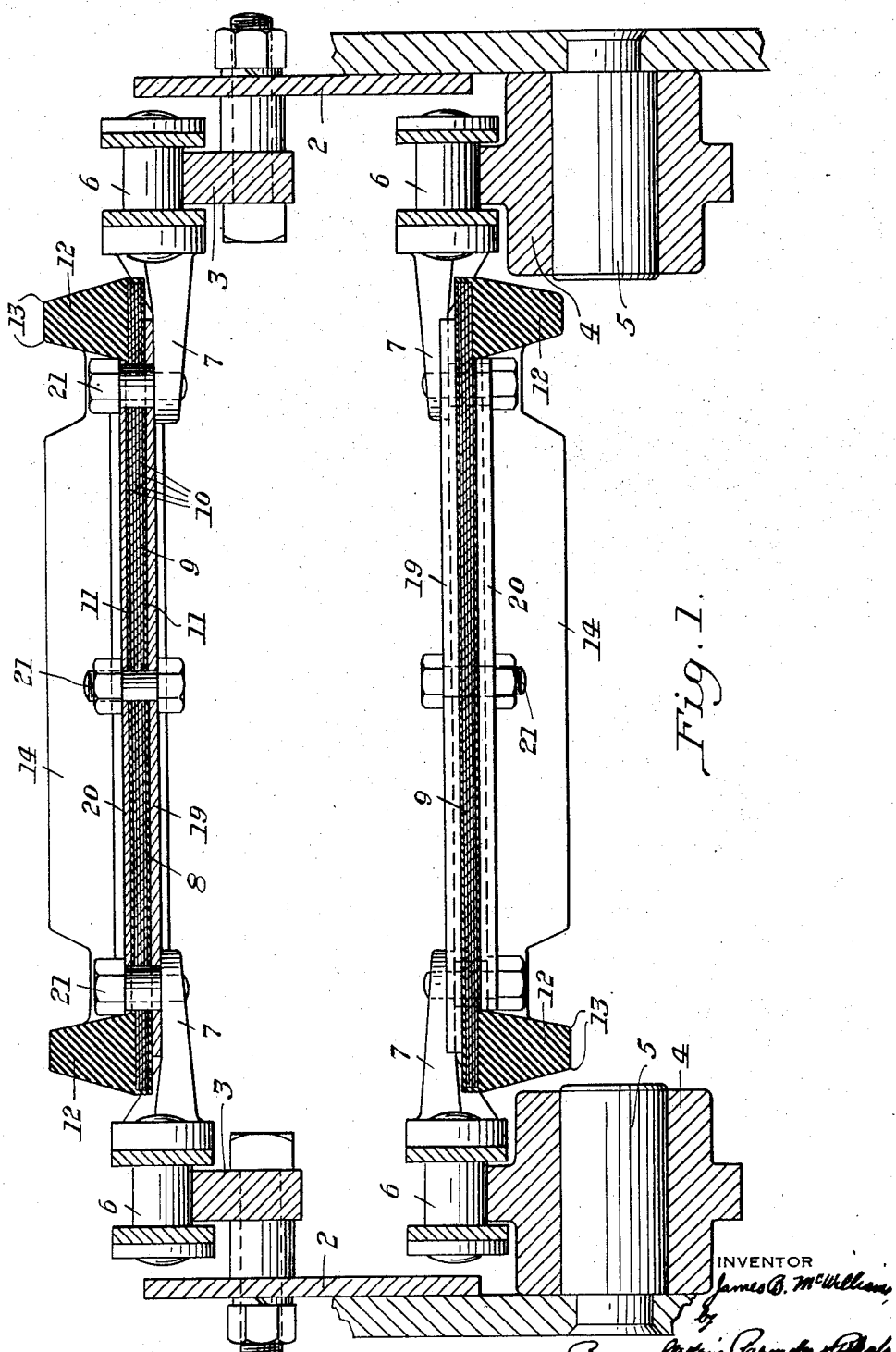

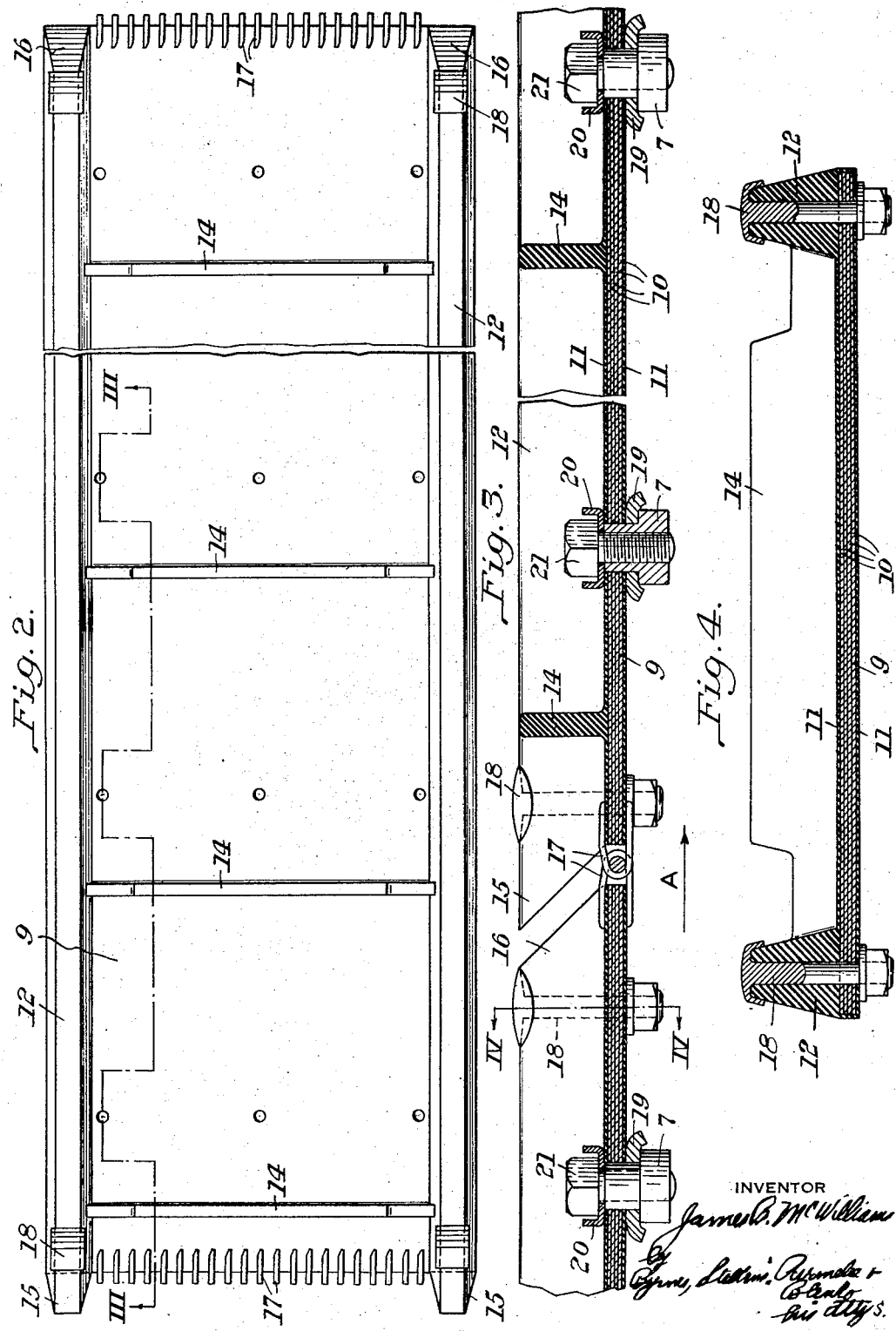

Patented Feb. 28, 1933

1,899,766

UNITED STATES PATENT OFFICE

JAMES B. McWILLIAMS, OF PITTSBURGH, PENNSYLVANIA

CONVEYER

Application filed November 25, 1930. Serial No. 498,080.

The present invention relates broadly to the art of material handling apparatus, and more particularly to apparatus of the character usually referred to as conveyers or flight conveyers and utilized for the purpose of handling and conveying material in bulk.

It has heretofore been customary in the art to which the present invention relates to construct conveyers of the general character herein contemplated either in the form of substantially flat belts which are supported on troughing rollers in such manner as to give trough-like characteristics to the belt, or to build up the conveyer of a plurality of parts including a main body portion, side angles and flight angles whereby the conveyer has such a cross section apart from its supporting means as to effectively support the material to be handled.

Conveyers of the first type are open to the objection that their use is limited to relatively wide conveyers composed of extremely flexible material thereby requiring a complicated system of supporting and troughing rollers. The necessity also of maintaining the conveyers substantially flat at the discharge end limits their use to apparatus in which a receptacle may be utilized of such characteristics as to substantially overlie a portion of the discharging end of the conveyer and receive any of the loose material which tends to spill over the edges.

Conveyers of the latter type are open to the objection of great weight, high cost and expensive maintenance.

The present invention has for one of its objects the provision of a conveyer satisfactorily answering all of the requirements of conveyers of either of the types referred to, while obviating the disadvantages as to construction and the limitations as to use.

In the accompanying drawings I have shown for purposes of illustration only, a preferred embodiment of the present invention and illustrated one manner of using the same. In the drawings:

Figure 1 is a vertical transverse sectional view through a conveyer constructed in accordance with the present invention, together with the operating and supporting means therefor;

Figure 2 is a top plan view of a portion of the conveyer per se illustrated in Figure 1;

Figure 3 is a longitudinal sectional view, on an enlarged scale, along the line III—III of Figure 2; and Figure 4 is a transverse sectional view on the line IV—IV of Figure 3, looking in the direction of the arrows.

While a conveyer constructed in accordance with the present invention may be utilized in a variety of different ways for any desired purpose, it is herein illustrated as being suported from opposite sides thereof by conveyer chains. It will be understood, however, as the invention becomes better understood, that the conveyer is of such construction that it may be utilized in the usual manner of a belt conveyer and supported directly on suitable pulleys which carry the conveyer and define its path of travel.

In the embodiment of the invention illustrated in Figure 1 there is illustrated a portion of a supporting framework 2 having secured thereto and projecting inwardly therefrom upper tracks 3 and lower tracks 4. In the form of the embodiment shown, the lower track 4 comprises a series of idler rollers carried by suitable stub shafts 5, although the track may be of any desired construction.

Cooperating with the supporting track system just referred to are conveyer chains 6 of any desired construction having projecting inwardly from the links thereof brackets 7 adapted to directly receive and support a conveyer 8.

This conveyer, which may be of any desired dimensions and of any preferred cross sectional configuration depending upon the uses to which it is to be put and the material to be handled thereby, is herein illustrated as comprising a body portion 9 which is substantially flat and of approximately uniform thickness throughout its width. This body portion is preferably of such construction as to be relatively inelastic and of limited yielding characteristics, while sufficiently flexible to permit it to travel in a continuously closed path as desired. To this end the main body 9 is conveniently constructed of a suitable number of superimposed layers of fabric or fabric-like material 10 secured in superimposed relationship in any desired manner as by vulcanizing, and provided with a wearing and protecting, preferably waterproof, surface 11 on each side thereof. I have found that such surface may be conveniently formed of rubber which readily lends itself to intimate union with the fabric body.

Formed integrally with the body 9 on each side thereof is a side wall 12, which side walls are preferably of elastic readily yielding characteristics permitting the same to elongate as required during travel of the conveyer through its orbit. To this end, the side walls are preferably constructed of live rubber molded integrally with the covering 11 whereby the body and side walls present a unitary structure. By reference more particularly to Figure 4 of the drawings, it will be apparent that the side walls are of relatively great height as compared to the thickness of the main body of the conveyer. In this manner there is provided a conveyer having the desired material handling capacity, the elastic characteristics of the side walls permitting the required elongation thereof during travel of the conveyer around the end pulley or other supporting means. By utilizing live rubber, as referred to, it is possible with a conveyer having a body thickness, by way of example only, of one-quarter inch and side walls of approximately one inch in height to successfully operate the conveyer with the active and return runs thereof spaced a distance of not more than five inches. This serves to illustrate the flexibility of a structure in accordance with the present invention and the advantages to be derived from the different characteristics of the body portion and side walls.

I have further found that the ease of flexing or elongating the side walls is increased by constructing the side walls of gradually decreasing cross sectional area in a direction away from the body of the conveyer. This may be conveniently accomplished by providing the side walls with inclined sides as readily apparent from Figure 4, and obviate any tendency toward checking or cracking of the upper corners 13 of the side walls during use of the conveyer.

In the handling of bulk material it is often desirable or necessary to provide the same at spaced points throughout the length thereof with flights or cleats effective for preventing slippage between the conveyer and the material. This is particularly true when the active surface of the conveyer travels in a path inclined to the horizontal. In accordance with the present invention I have provided cleats 14 at suitable intervals extending transversely of the conveyer and preferably formed integrally both with the covering material 11 and with the side walls 12. Such cleats are conveniently constructed of relatively elastic readily yielding material similar to the side walls 12, thereby permitting the same to readily adjust themselves to the dimensional changes of the side walls during their travel in an endless path.

The use of cleats of readily deformable material possesses a further advantage particularly in the handling of bulk material containing lumps, stones, foreign material or the like. This will be appreciated when it is considered that in many cases it is necessary to cause a conveyer to discharge directly onto a reciprocating screen or the like which, by reason of space limitations, necessarily cooperates with the conveyer at the point at which it is making a return bend. In such cases it not infrequently happens that a stone or the like will catch between the screen and one of the cleats and result in serious damage to the installation. With a readily deformable cleat, however, the cleat readily yields or slips by such an obstruction without injury to any of the mechanism. Similar advantages result from the use of a conveyer in boots or relatively confined spaces wherein there is possibility of injury to the parts in a generally similar manner.

While it is feasible to construct a conveyer in accordance with the present invention of a continuous section or length, it is preferably formed of a plurality of sections due to the greater ease of manufacturing. Regardless of the number of sections of which the complete conveyer is formed, it is desirable to so construct the side walls as to preclude the spilling of material from the conveyer at the junction point or points of the section or sections. To this end I preferably so shape the opposite ends of the side walls on any given section as to afford an interfitting engagement therebetween. By reference to Figure 3 of the drawings, it will be apparent that the end portions 15 are under-cut. The opposite end portions 16 are cut at the same angle so as to form an overlap and substantially continuous side wall with the ends of the section or sections in assembled relationship. For effecting such an assembly, the opposite ends of each section are provided with suitable connecting means 17 of any desired construction. In operation, the conveyer will preferably be caused to travel in the direction of the arrow A in Figure 3, thereby minimizing the possibility of distortion of the end portions 15.

For further reinforcing such end portions I may, if desired, provide the same with metal clips or bolts 18 extending therethrough and serving to reinforce the attachment or union between the side walls and the belt body.

For securing my improved belt to the brackets 7, I may provide transversely extending metallic strips or the like 19 adapted to cooperate with upper strips 20 between which the body 9 of the belt is clamped by means of suitable bolts 21, certain of these bolts also extending through the brackets 7 for securing the entire conveyer assembly to the brackets.

Where the conveyer is utilized as an ordinary belt conveyer without conveyer chains, the strips 19 and 20 together with the bolts 21 will obviously be omitted, the belt being directly supported on rollers, pulleys, shafts or the like.

A conveyer of the character described may be inexpensively constructed and is of relatively light weight as compared to conveyers as heretofore utilized. It also provides a unitary structure in which the side walls are formed or molded integrally with the body and in which the cleats 14 are likewise formed or molded integrally with both the body and the side walls. The differences in the elastic and yielding characteristics of the cleats and side walls as compared to the main body of the conveyer afford a body of comparatively great strength and load supporting ability while permitting the side walls to elongate and contract as required by the travel of the conveyer and permitting the cleats to deform or otherwise adjust themselves to the material being handled.

A further advantage of a conveyer belt of the character described resides in the fact that when utilized as a straight belt conveyer without conveyer chains, it is unnecessary to provide either the body or the side walls with attaching openings such as would tend to admit moisture or destroy the original unitary characteristics or strength of the conveyer. The protective covering 11 may thus be maintained so as to most effectively serve its intended purpose.

While I have herein illustrated and described a preferred embodiment of the present invention, it will be understood that changes in the construction, operation and arrangement of the parts may be made without departing either from the spirit of the conveyer or the scope of my broader claims.

I claim:

1. As an article of manufacture, a conveyer belt comprising a fabric reinforced body portion having upwardly extending elastic side walls formed integrally with the body portion, the side wall of one end section of the conveyer extending into overlapping relationship with the side walls of another end section.

2. As an article of manufacture, a conveyer belt comprising a fabric reinforced body portion having upwardly extending elastic side walls formed integrally with the body portion, the side walls of one end section of the conveyer extending into overlapping relationship with the side walls of another end section, there being reinforcing means extending through the body and side walls adjacent the overlapping end portions thereof.

3. As an article of manufacture, a conveyer belt comprising a fabric reinforced body portion having upwardly extending elastic side walls formed integrally with the body portion, the side walls of one end section of the conveyer extending into overlapping relationship with the side walls of another end section, there being readily deformable cleats extending transversely of the conveyer belt and formed integrally with the body and said side walls.

In testimony whereof I have hereunto set my hand.

JAMES B. McWILLIAMS.